United States Patent [19]

Isomura et al.

[11] Patent Number: 5,012,372
[45] Date of Patent: Apr. 30, 1991

[54] HEAD ACCESS MECHANISM FOR MOVING HEADS

[75] Inventors: Akihiro Isomura; Toshihiro Sugaya, both of Tokyo, Japan

[73] Assignee: Kabushiki Kaisha Toshiba, Kawasaki, Japan

[21] Appl. No.: 259,824

[22] Filed: Oct. 19, 1988

[30] Foreign Application Priority Data

Oct. 20, 1987 [JP] Japan ................................. 62-264185

[51] Int. Cl.$^5$ ............................................. G11B 21/08
[52] U.S. Cl. ................................... 360/106; 300/78.12
[58] Field of Search ............. 360/106, 105, 109, 78.12

[56] References Cited

U.S. PATENT DOCUMENTS

| | | | |
|---|---|---|---|
| 4,393,425 | 7/1983 | Wright | 360/105 |
| 4,414,594 | 11/1983 | Farmer et al. | 360/106 |
| 4,415,941 | 11/1983 | Gibeau et al. | 360/106 |
| 4,462,054 | 7/1984 | Dong et al. | 360/106 |
| 4,743,987 | 5/1988 | Farmer et al. | 360/106 |
| 4,745,503 | 5/1988 | Muraoka et al. | |
| 4,819,110 | 4/1989 | Funai et al. | 360/106 |
| 4,864,447 | 9/1989 | Takekado et al. | 360/106 |

FOREIGN PATENT DOCUMENTS

| | | | |
|---|---|---|---|
| 55-67974 | 5/1980 | Japan | 360/106 |
| 58-161176 | 9/1983 | Japan | |
| 59-501135 | 6/1984 | Japan | |
| 61-26976 | 2/1986 | Japan | 360/106 |
| 61-196751 | 3/1986 | Japan | |

OTHER PUBLICATIONS

IBM/TDB vol. 12, No. 12, May 1970 p. 2273 "High Force Constant Voice Coil Motor for Rapid Seek" by Rexford.

*Primary Examiner*—John H. Wolff
*Attorney, Agent, or Firm*—Cushman, Darby & Cushman

[57] ABSTRACT

An access mechanism includes a fixed generating section for generating a first magnetic field, and a carriage, having at least one head, for generating a second magnetic field so as to be moved together with the head in accordance with a propulsive force generated by interaction between the first and second magnetic fields. The center of gravity of the carriage is substantially located on a line along which the propulsive force acts. The carriage includes a coil for generating the second magnetic field in accordance with a supplied current. The generating section and the coil constitute a voice coil motor. The access mechanism further includes a rail member arranged in a moving direction of the carriage, and a base member, coupled to the carriage and movably engaged with the rail member through bearings, for guiding movement of the carriage driven by the voice coil motor.

18 Claims, 8 Drawing Sheets

HEAD ACCESS MECHANISM FOR MOVING HEADS

BACKGROUND OF THE INVENTION

1. Field of the Invention

The present invention relates to a head access mechanism for moving a head, which is suitably used in recording/reproducing apparatus such as floppy disk and hard disk units for high-density recording.

2. Description of the Related Art

Figure 1A:
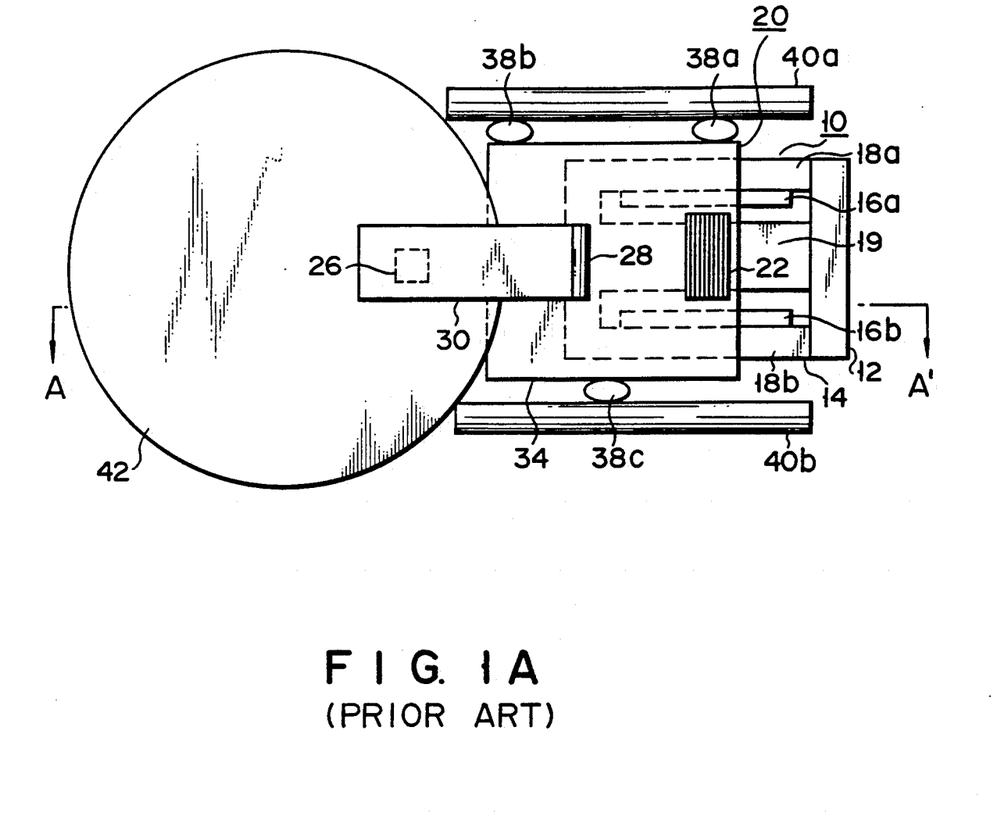
FIG. 1A (Prior Art) is a plan view showing an arrangement of a conventional linear actuator as an access mechanism.
Figure 1B:
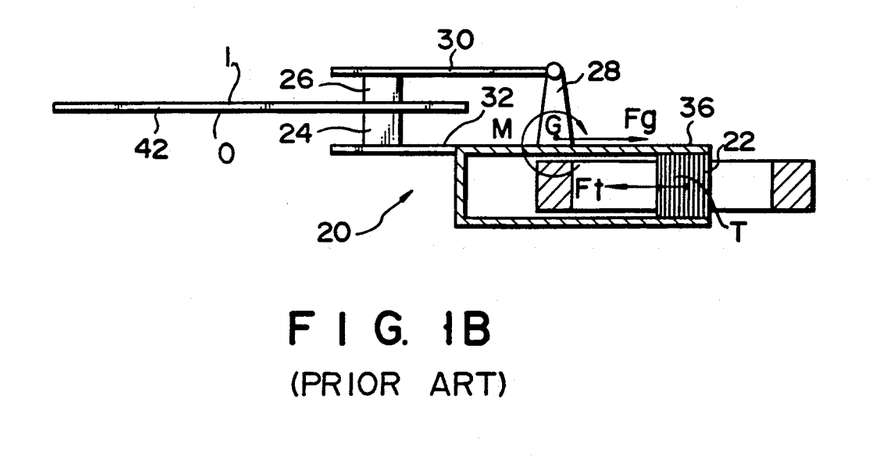
FIG. 1B (Prior Art) is a sectional side view taken along line A-A' of FIG. 1A.

Conventional recording/reproducing apparatus such as floppy disk and hard disk units for high-density recording comprise a linear actuator in a head access mechanism for moving a magnetic head in the radial direction of a recording disk. As such a linear actuator, a low-profile actuator shown in FIGS. 1A and 1B is proposed in Japanese Unexamined Patent Disclosure No. 61-196751. The linear actuator shown in FIG. 1A comprises fixed magnetic field generating section 10 and a carriage section 20 as a moving section.

Generating section 10 is fixed and comprises an E-shaped yoke 14 including central extending portion 19 and side extending portions 18a and 18b, an I-shaped yoke 12 connected to the ends of portions 19, 18a, and 18b. Yokes 12 and 14 comprise a closed magnetic circuit. Permanent magnets 16a and 16b are arranged parallel to side extending portions 18a and 18b so as to oppose central extending portion 19.

Carriage section 20 comprises case 34, coil 22 having both its upper and lower ends fixed to case 34, and magnetic heads 24 and 26 respectively arranged on sides 0 and 1. Central extending portion 19 extends through the central hole of coil 22 without contacting each other. A magnetic field generated by coil 22 in accordance with a supplied current interacts with a magnetic field generated in central extending portion 19 by magnets 16a and 16b, and generates a propulsive force. Generating section 10 and coil 22 comprise a voice coil motor. Case 34 has a box-like shape, and can house most of generating section 10. Magnetic head 24 is arranged on arm portion 32 extending along the same plane as that of upper plate 36 of case 34 on a side opposite to generating section 10. Support 28 is mounted on upper plate 36. Arm portion 30 having magnetic head 26 is mounted on the distal end of support 28 so as to be freely rotated in the vertical direction. Magnetic head 26 on side 1 is attached to arm portion 30 so as to oppose magnetic head 24 on side 0.

As described above, generating section 10 and coil 22 comprise the voice coil motor. Carriage section 20 is linearly driven in accordance with a current supplied to coil 22. Rotary bearings 38a, 38b, and 38c are attached to the outside of case 34. Rotary bearings 38a to 38c are guided by fixed guide rails 40a and 40b so that case 34 and hence magnetic heads 24 and 26 are linearly moved in the radial direction of recording disk 42.

In the linear actuator having such a structure, since most of generating section 10 can be housed in case 34, the overall height can be reduced, and hence a low-profile actuator can be realized. In addition, since case 34 has a box-like structure, a sufficient mechanical strength can be obtained, and moreover, an excellent resonance frequency characteristic (high resonance frequency) can be obtained.

In such a conventional linear actuator, however, heads 24 and 26, arm portion 30, and support 28 are located above upper plate 36 of case 34, as shown in FIG. 1B. For this reason, center of gravity G of carriage section 20 is located above central position T of coil 22 in the vertical direction. When a magnetic field generated by coil 22 in accordance with a supplied current interacts with a magnetic field generated in central extending portion 19 of generating section 10, a propulsive force obtained by the interaction is applied to central position T of coil 22. When carriage section 20 is moved by propulsive force Ft, inertia force vector Fg acting on center of gravity G is not present on the same line as that of the vector of propulsive force, i.e., propulsive force vector Ft. Therefore, moment M is generated around center of gravity G. This causes pitching when carriage section 20 is linearly moved, so that a resonance point is generated in a low-frequency band because of this pitching. As a result, when a servo control is employed to position the head, the system for the servo control becomes unstable, or oscillates due to the low-frequency resonance point. Also, for example, the contact state of each of the magnetic heads 24 and 26 with the recording disk 42 becomes unstable. Therefore, this poses a problem when a magnetic head must be positioned on a destination track of a magnetic disk with high precision.

SUMMARY OF THE INVENTION

It is an object of the present invention to provide an access mechanism with an excellent frequency characteristic, which has a low-profile structure, and can prevent generation of a resonance point due to so-called pitching when a carriage is moved.

The access mechanism of the present invention comprises a fixed generating section for generating a first magnetic field, and a carriage, having at least one head, for generating a second magnetic field so as to be moved together with the head in accordance with a propulsive force generated by interaction between the first and second magnetic fields. The center of gravity of the carriage is substantially located on a line along which the propulsive force acts. The carriage includes a coil for generating the second magnetic field in accordance with a supplied current. The generating section and the coil comprise a voice coil motor. The access mechanism further comprises a rail member arranged in a moving direction of the carriage, and a linear guide member, coupled to the carriage and movably engaged with the rail member through bearings, for guiding movement of the carriage driven by the voice coil motor.

As described above, according to the present invention, in a linear actuator having a low-profile structure which is used in recording/reproducing apparatus such as floppy disk and hard disk units for high-density recording, when a magnetic head is moved, resonance due to pitching can be prevented, and hence an excellent frequency characteristic can be obtained. Therefore, if this linear actuator is used in the above recording/reproducing apparatus, the contact state of the magnetic head with a recording medium can be stabilized in a seek operation of the magnetic head. In addition, since each head and the voice coil motor can be positioned at substantially the same height, a margin of space in the height direction of the linear actuator can be assured. Moreover, if the linear actuator has the same height as that of the conventional linear actuator, the driving force of the motor can be increased with an increase in effective length of the coil.

DETAILED DESCRIPTION OF THE PREFERRED EMBODIMENTS

An access mechanism of the present invention will be described in detail below with reference to the accompanying drawings.

An arrangement of an access mechanism according to a first embodiment of the present invention will be described first with reference to FIGS. 2 and FIGS. 3A to 3C by exemplifying a magnetic disk unit. The same reference numerals in FIG. 1 denote the same parts as in FIGS. 2 and FIGS. 3A to 3C, and a description thereof will be omitted. Since magnetic field generating section 10 has the same arrangement as that in FIG. 1, a description thereof will be omitted.

Figure 2:
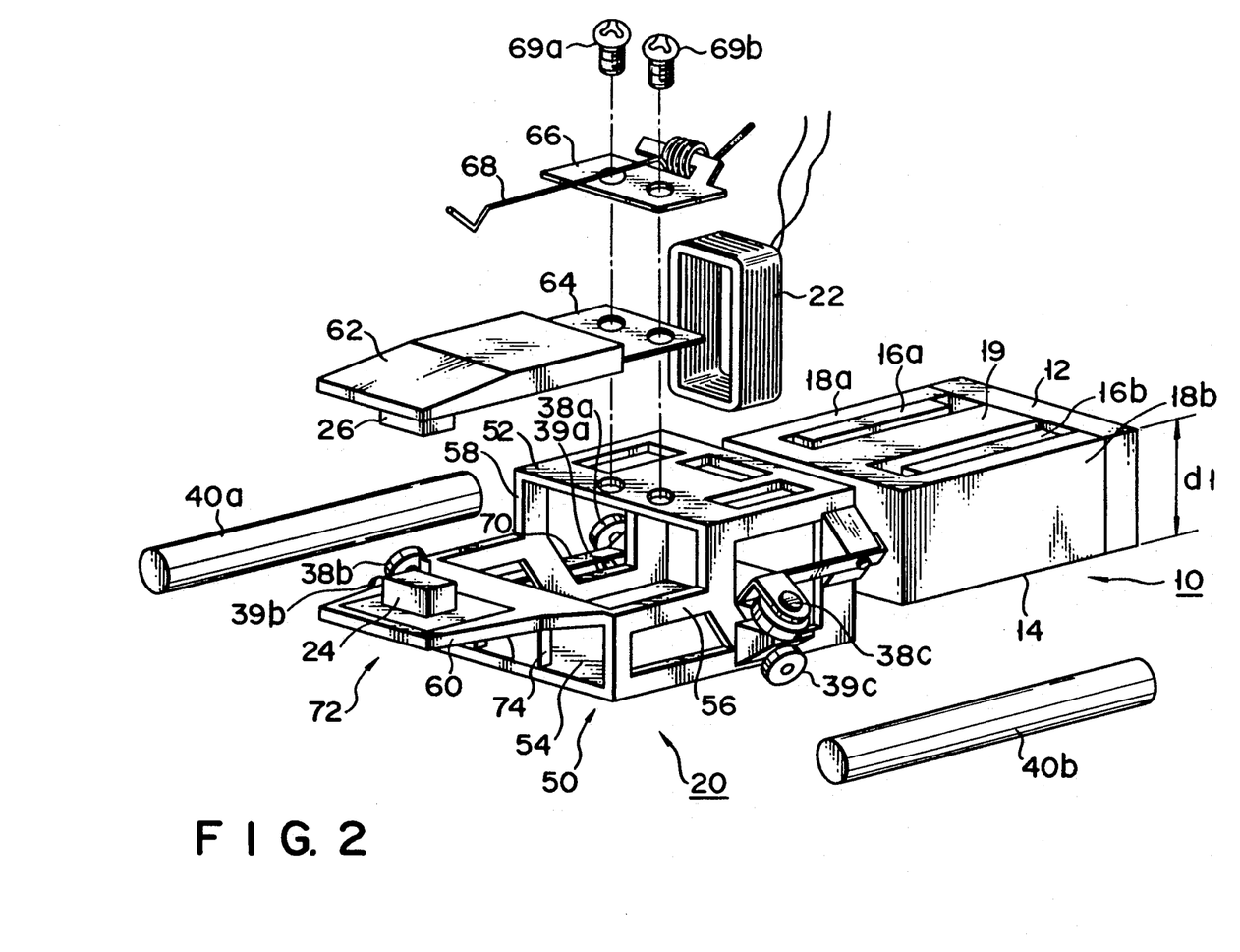
FIG. 2 is an exploded perspective view showing an arrangement of an access mechanism according to a first embodiment of the present invention.

Case 50 has a box-like structure in which upper and lower plates 52 and 54 are coupled by side plate members 56, 58 and 74 so as to have a hollow portion, and can house generating section 10 in its hollow portion. Coil 22 comprising part of a voice coil motor is fixed to upper and lower plates 52 and 54 of case 50. Central extending portion 19 of E-shaped yoke 14 extends through the central portion of coil 22 without the two contacting each other. Coil 22 is linearly moved in a longitudinal direction of central extending portion 19.

Head supporting section 72 of carriage section 20 which has magnetic heads 24 and 26 for accessing magnetic disk 42 is connected to the side of case 50 opposite the generating section 10. In head supporting section 72, head 26 on side 1 of disk 42 is fixed to arm portion 62. Arm portion 62 comprises leaf spring 64, which is fixed to upper plate 52 by screws 69a and 69b through leaf spring press member 66. Head load spring 68 is attached to the leaf spring press member 66. Arm portion 62 is urged by head load spring 68 downward toward head 24 on side 0 of disk 42. With this arrangement, arm portion 62 is mounted on upper plate 52 to be vertically movable. Head 24 on side 0 is supported by one end of support member 60 at a position opposite to head 26 on side 1. Support member 60 is held by side plate members 56, 58 and 74 of case 50 at the other end, and is placed at a predetermined height from a lower edge of case 50. In the above description, the two opposite heads are present. However, the present invention can be equally applied to a case wherein only one head is present.

Figure 3A:
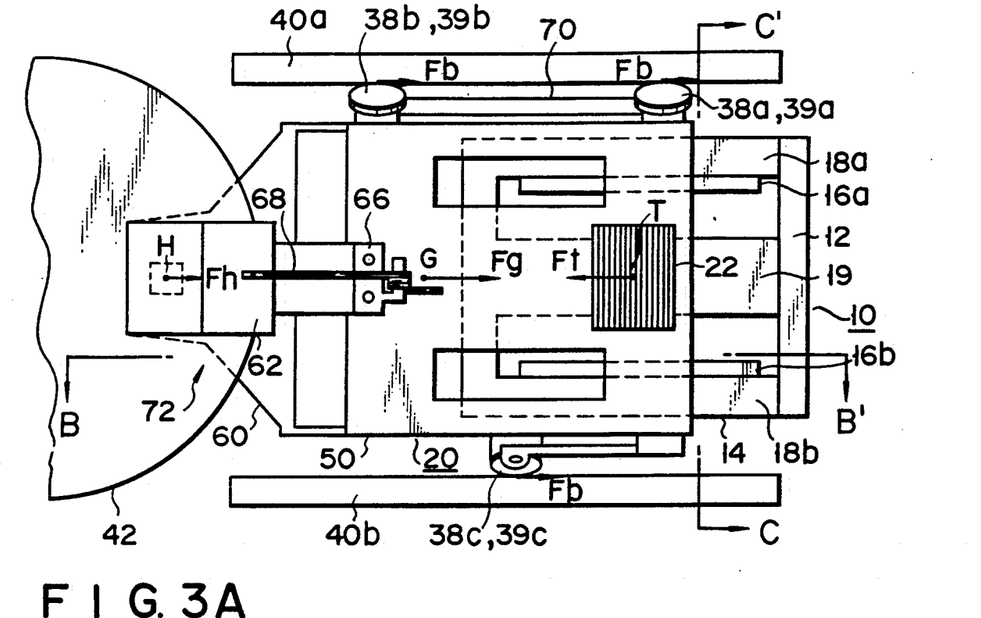
FIGS. 3A, 3B, and 3C are a plan view showing an arrangement of the access mechanism according to the first embodiment, and sectional views taken along lines B-B' and C-C' of FIG. 3A, respectively.

As is apparent from FIG. 3A, carriage section 20 including case 50 and head supporting section 72 has substantially bilaterally symmetrical structure. Rotary bearing 38c having a pre-load mechanism and fixed rotary bearing 39c are attached to side plate member 56, whereas two pairs of fixed rotary bearings 38a and 39a, and 38b and 39b are attached to the opposite side.

An operation of the first embodiment will be described below.

Figure 8:
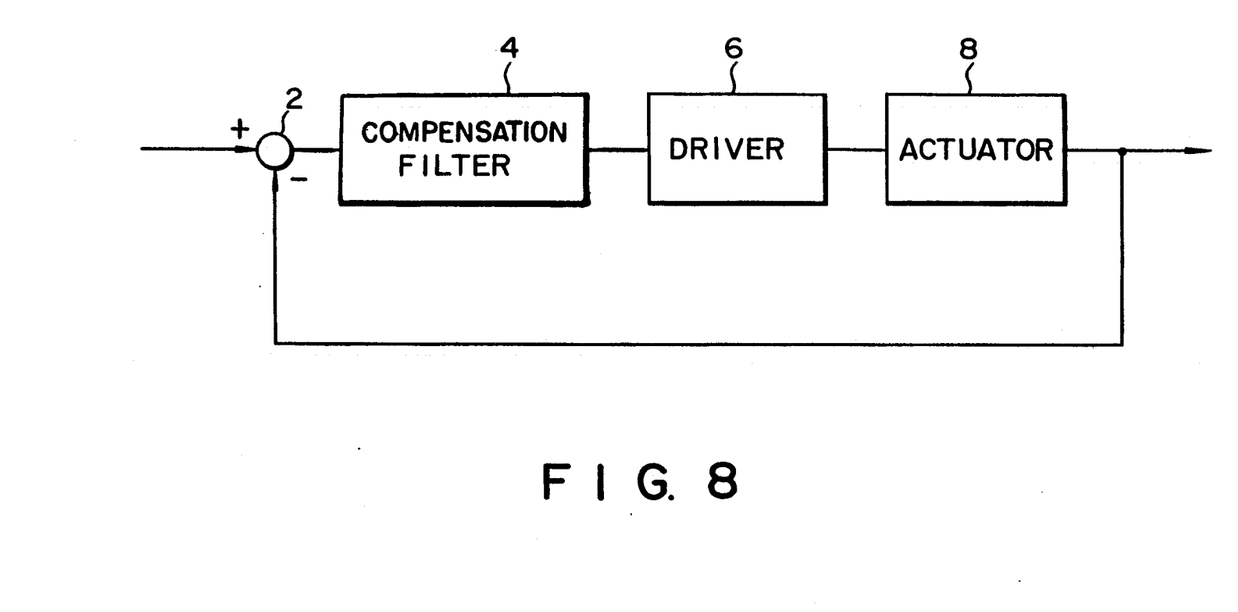
FIG. 8 is an illustration for explaining a head positioning operation.

Referring to FIG. 8, when the heads are moved to a destination head position, destination head position data is input from an external device. Data indicating a current head position is determined from a position signal generated by head 24 or 26. Substrater 2 subtracts the current position data from the destination head position data to obtain difference data. The difference data is subject to a compensation processing such as smoothing in compensation filter 4 and is supplied to driver 6. Driver 6 supplies a current to coil 22 in accordance with the compensated difference data. This causes carriage section 20 to move toward a destination head position. During the movement of carriage section 20, head 24 or 26 read position data to generate the position signal. Thus, heads 24 and 26 are moved to the destination head position.

A magnetic field generated by magnets 16a and 16b is present in a magnetic circuit of generating section 10. When a current flows through coil 22 of the voice coil motor, carriage section 20 is linearly moved in the radial direction of disk 42 in accordance with the direction of the current flowing through coil 22 because of the interaction between the magnetic field in generating section 10 and a magnetic field generated by coil 22. In this case, case 50 is linearly moved along parallel guide rails 40a and 40b arranged on both the sides of case 50.

Figure 3B:
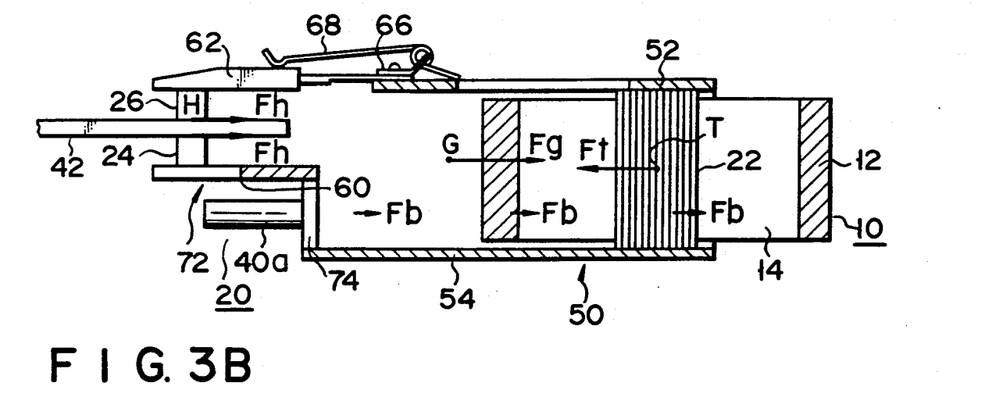
Figure 3C:
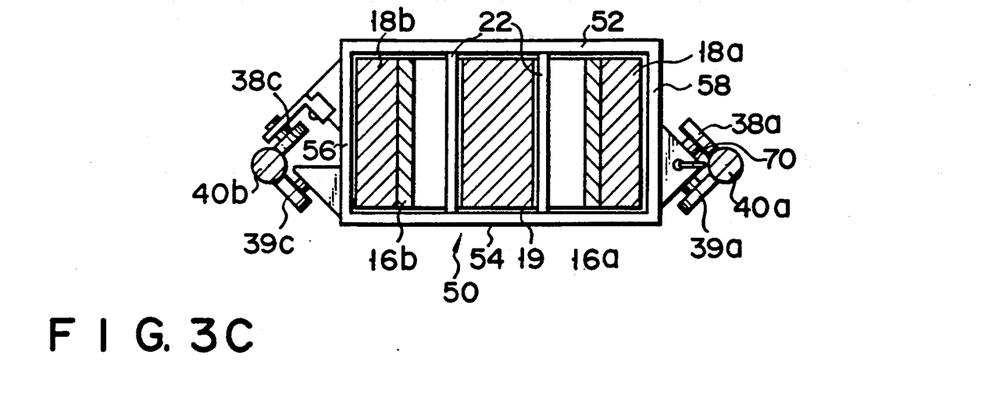
Figure 4:
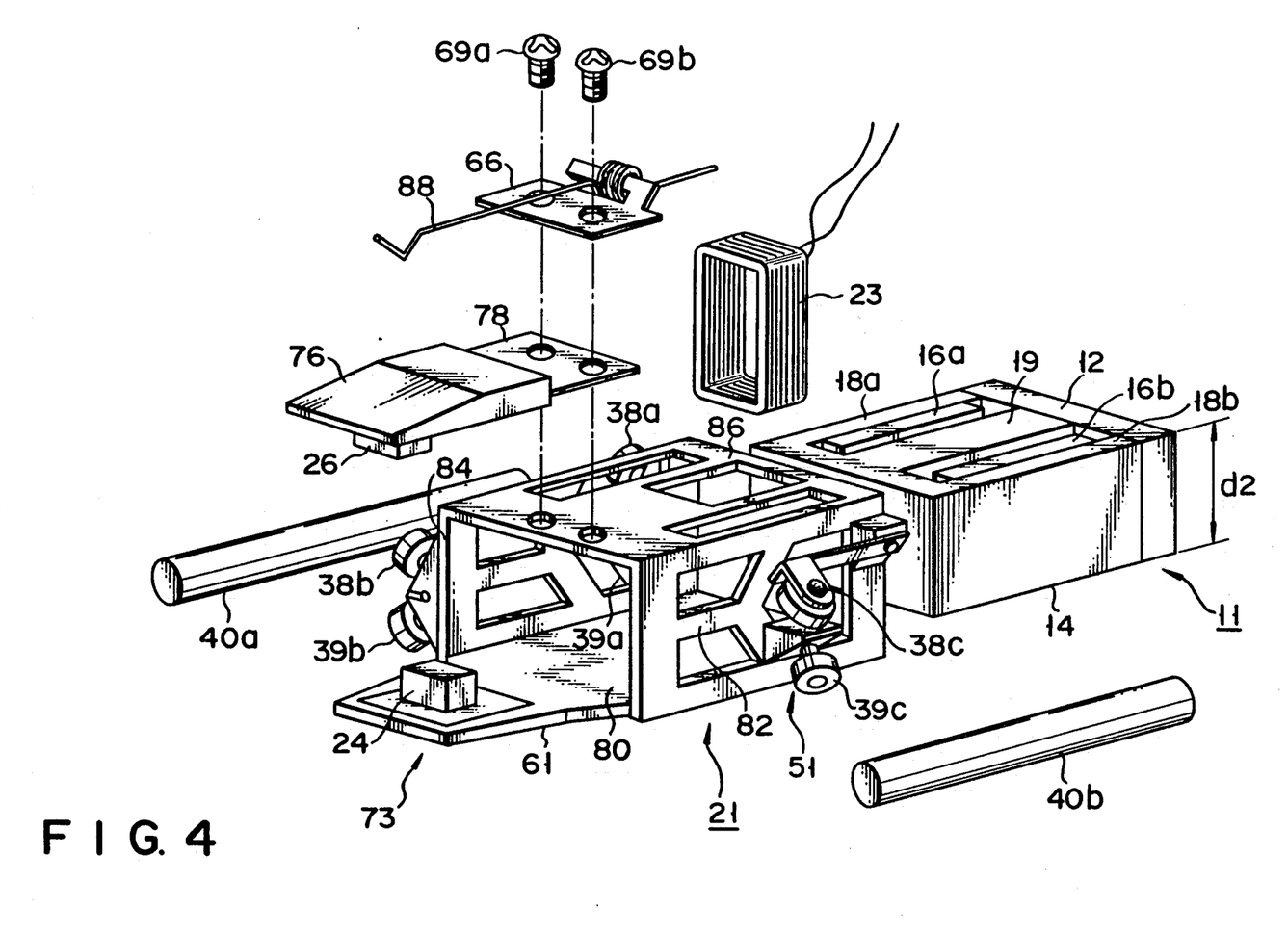
FIG. 4 is an exploded perspective view showing an arrangement of an access mechanism according to a second embodiment of the present invention.

As shown in FIGS. 3A to 3C, generating section 10 can be housed in the hollow portion of case 50 of the first embodiment, and generating section 10 and head supporting section 72 having heads 24 and 26 are arranged on both end portions of case 50 at positions substantially opposite to each other. With this arrangement, center of gravity G of carriage section 20 is substantially set at center T of coil 22, i.e., on propulsive force vector Ft. Consequently, while carriage section 20 is linearly moved, propulsive force Ft and inertia force vector Fg acting on center of gravity G are generated on substantially the same line. This can greatly suppress generation of pitching due to a moment generated around center of gravity G, and hence can prevent generation of a resonance point due to the pitching.

In addition, according to the structure of the first embodiment, since lower head 24 is attached at a predetermined height from lower plate 54, i.e., guide rails 40a and 40b are lower than the disk 42, as shown in FIG. 2, the central positions of guide rails 40a and 40b are located at a position lower than the surface of head 24. For this reason, as shown in FIG. 3B, frictional force vector Fb acting between rotary bearings 38a to 38c and 39a to 39c, and guide rails 40a and 40b tends to generate a moment around center of gravity G, whereas frictional force vector Fh acting between heads 24 and 26, and disk 42 (position H in FIG. 3B) tends to generates a moment in the opposite direction around center of gravity G. Both the moments are substantially balanced, thereby canceling the generation of pitching due to the respective frictional forces acting between rotary bearings 38a to 38c and 39a to 39c, and guide rails 40a and 40b, and between heads 24 and 26, and recording medium 42 can be suppressed.

An arrangement of an access mechanism according to a second embodiment of the present invention is shown in FIG. 4 and FIGS. 5A to 5C. As is apparent from the drawings, the arrangement of the second embodiment is similar to that of the first embodiment. Therefore, only different points will be described.

In the first embodiment, magnetic field generating section 10 has height d1. In the second embodiment, however, generating section 11 has height d2 (d1>d2), and hence the profile of the access mechanism can be further lowered. In accordance with this lowered profile, the profile of carriage section 21 can be also lowered. Note that the planar structure of generation section 11 remains the same as section 10.

Figure 5A:
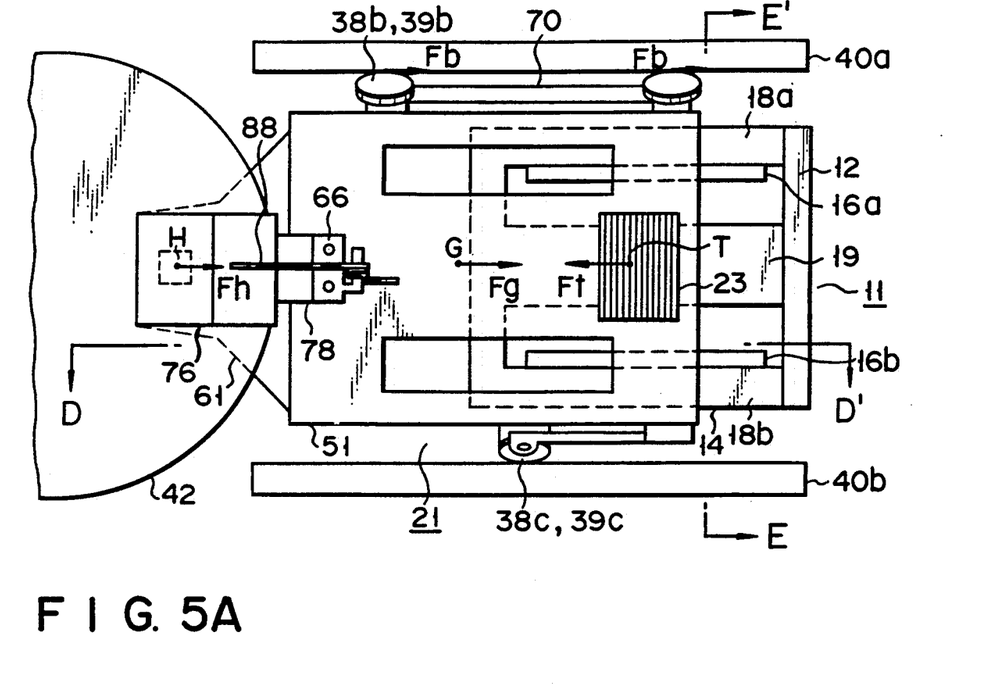
FIGS. 5A, 5B, and 5C are a plan view showing an arrangement of the access mechanism according to the second embodiment, and sectional views taken along lines D-D' and E-E' of FIG. 5A, respectively.
Figure 5B:
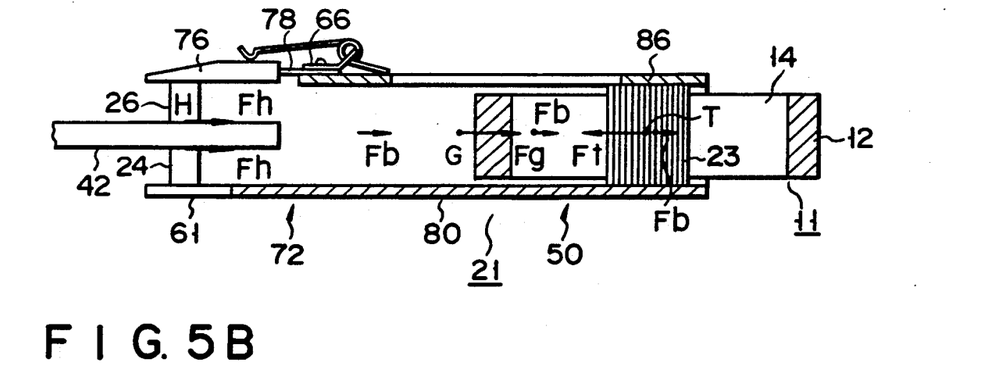
Figure 5C:
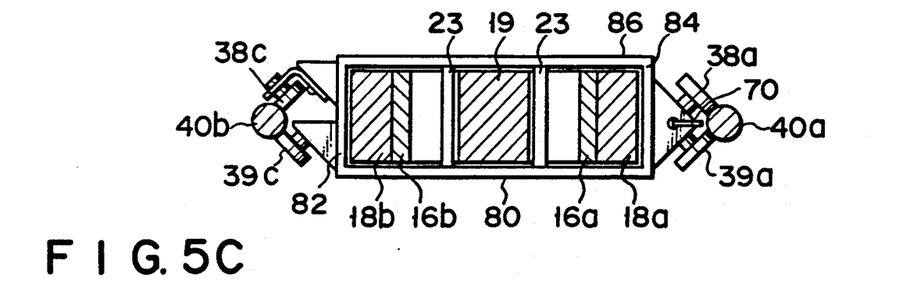

Support member 61 for supporting head 24 on side 0 continuously extends from lower plate 80 of case 51 in a direction opposite generating section 11. Similar to the first embodiment, head 26 on side 1 is fixed to upper plate 86 of case 51 by arm portion 76, leaf spring 78 and leaf spring press member 66. Therefore, the center of gravity G of carriage section 21 is located on the center T of propulsive force vector Ft of coil 23, as shown in FIG. 5B. As is apparent from FIG. 5C, the contact surfaces between guide rails 40a and 40b, and rotary bearings 38a to 38c and 39a to 39c are located at substantially the center of case 51, and hence the frictional force vectors Fb are located on substantially the center of propulsive force vector Ft. In addition, since the contact surfaces between heads 24 and 26 of head supporting section 73 are located at substantially the center of case section 51, frictional force vectors Fh are present on substantially the center of propulsive force Ft.

As described above, in the second embodiment, no gap is present between lower plate member 80 and support member 61 of case 51 in the height direction. Therefore, the second embodiment is advantageous over the first embodiment in that center of gravity G of carriage section 21 can be easily set on the central line of coil 23 (the extension line of center T of the propulsive force) with accuracy. As a result, propulsive force vector Ft and inertia force vector Fg of carriage section 21 can be reliably generated on the same line upon driving of coil 23. Therefore, pitching can be further suppressed when carriage section 21 is moved as compared with the first embodiment. In addition, since lower plate member 80 serves as a support member of head 24, the profile of the overall structure can be further reduced as compared with the first embodiment. Moreover, compared with the first embodiment, since the space in the height direction of yokes 12 and 14, and coil 23 can be relatively increased, the effective length of coil 23 can be increased. Therefore, the voice coil motor can have a relatively large driving force.

An arrangement of an access mechanism according to a third embodiment of the present invention will be described with reference to FIG. 6 and FIGS. 7A to 7C.

As shown in the drawings, a magnetic field generating section of an access mechanism according to the third embodiment comprises flat U-shaped yokes 112 and 118, and flat I-shaped yokes 116 and 122, arranged on both sides of coil holder 102, and magnets 114 and 120 fixed to the inner surfaces of first side extending portions of yokes 112 and 118. The generating section and coil 104 comprise a voice coil motor. Coil holder 102 is fixed at the center of the hollow portion of coil 104. Second side extending portions of U-shaped yokes 112 and 118 extend through the hollow portion along the right and left portions of coil holder 102 without contacting each other. Coil holder 102 comprises the main body of the carriage section together with coil 104, and lower and upper arms 134 and 138. Heads 132 and 136 on sides 0 and 1 are attached to arms 134 and 138, respectively, so as to oppose each other. Upper arm 138 is coupled to coil holder 102 through screw 144, leaf spring 140, and base plate 141. Head load spring 142 for urging head 136 downward toward lower arm 132 is fixed to upper arm 138.

Figure 6:
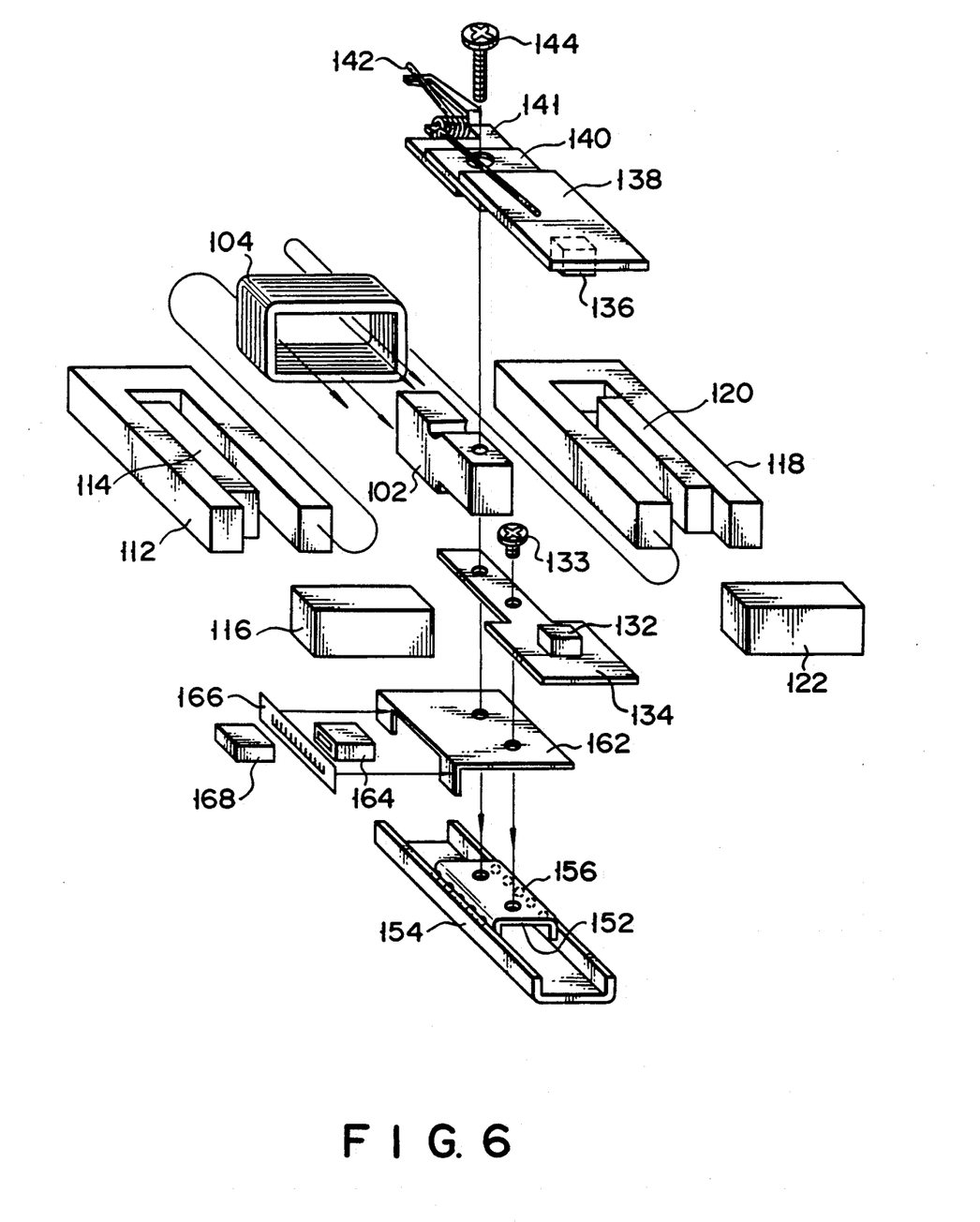
FIG. 6 is an exploded perspective view showing an arrangement of an access mechanism according to a third embodiment of the present invention.
Figure 7A:
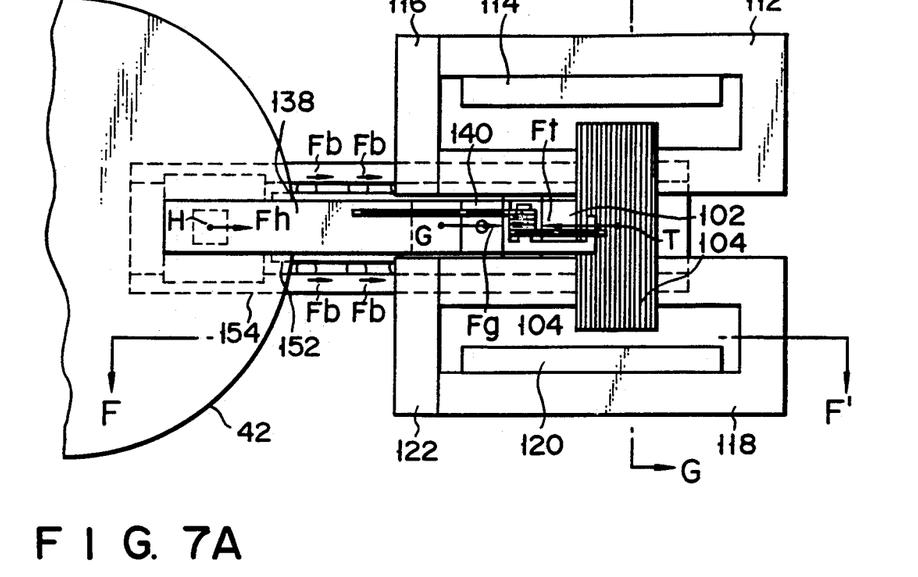
FIGS. 7A, 7B, and 7C are a plan view showing an arrangement of the linear actuator according to the third embodiment, and sectional views taken along lines F-F' and G-G' of FIG. 7A, respectively.
Figure 7B:
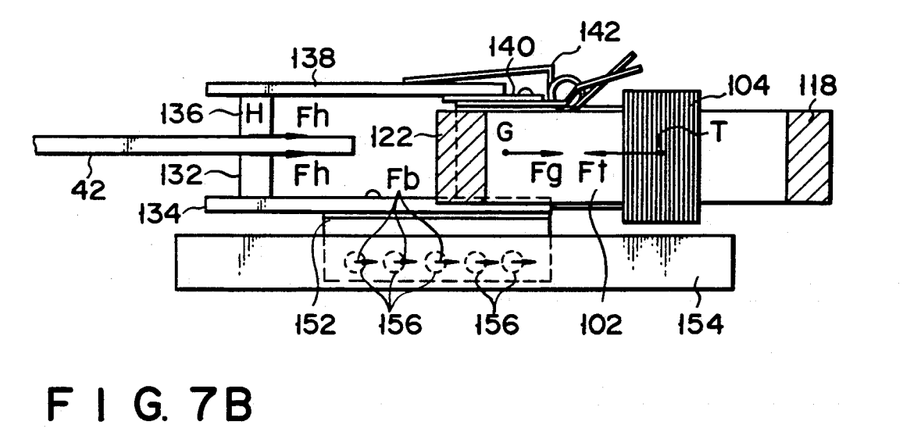
Figure 7C:
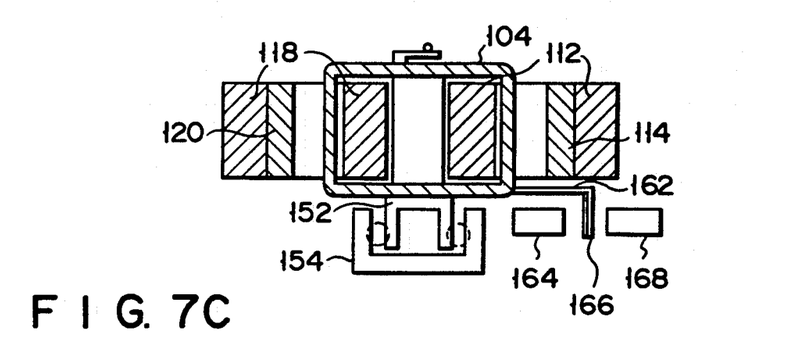

The carriage section is coupled to base member 152 through linear encoder holder 162. Base member 152 is movably engaged with rail member 154, which is arranged in the moving direction of the carriage section, through ball bearings 156. Linear encoder 166 for measuring the moving distance of the carriage section is mounted on linear encoder holder 162. Marks corresponding to, e.g., distance scale readings are recorded on linear encoder 166, and are detected by sensors 164 and 168. Sensors 164 and 168 are photoelectric sensors comprising, e.g., light-emitting and -receiving units.

In the access mechanism of the third embodiment, when a current flows through coil 104 comprising the voice coil motor, a magnetic field in the magnetic circuit constituted by magnets 114 and 120, and yokes 112, 116, 118, and 122 interacts with a magnetic field generated by coil 104 so as to linearly move coil holder 102 having coil 104 fixed thereto in a direction corresponding to the direction of the current flow. As a result, arms 134 and 138 mounted on coil holder 102 are linearly moved, and hence heads 132 and 136 are linearly moved in the radial direction of disk 42.

When the carriage section including coil holder 102 and arms 134 and 138 is to be moved by the driving force of the voice coil motor, its moving direction is guided by base member 152 and rail member 154. When the driving force of the voice coil motor is transmitted to coil holder 102, base member 152 coupled to coil holder 102 is moved in the radial direction of disk 42 along rail member 154 through ball bearing 156.

With such a moving mechanism using base member 152 and rail member 154, the an access mechanism which is stable in terms of structure and has a simple arrangement can be realized, as compared with the first embodiment. In the first embodiment, the mechanism using guide rails 40a and 40b, and rotary bearings 38a to 38c and 39a to 39c has a structure wherein the surfaces contacting each other are liable to damage. The mechanism of the third embodiment, however, has a structure superior to that of the first embodiment in terms of durability and is low in cost. Therefore, the moving mechanism using base member 152 and rail member 154 may be applied to the first embodiment in place of guide rails 40a and 40b, and rotary bearings 38a to 38c and 39a to 39c. Note that in the third embodiment and its modifications, the same effects as those in the first embodiment can be obtained.

What is claimed is:

1. A head access mechanism for accessing at least one head to a destination track on a disk, comprising:

first generating means fixedly arranged, for generating a first magnetic field, including:
a single E-shaped yoke member having two side extending portions and a central extending portion;
a single I-shaped yoke member which is coupled to distal ends of said two side extending portions and said central extending portion so as to form a magnetic circuit; and
magnetic field generating means for generating the first magnetic field in said magnetic circuit; and
carriage means for carrying a first head, including:
second generating means for generating a second magnetic field and receiving a propulsive force;
a casing which is fixed to said second magnetic field generating means and is capable of housing said first generating means; and
head supporting means arranged to said casing means at a position opposite to said generating means, for supporting said first head, said carriage means moving together with said first head in accordance with the propulsive force generated by interaction between the first and second magnetic fields, a center of gravity of said carriage means being present substantially on a line along which the propulsive force acts.

2. A mechanism according to claim 1, wherein said first magnetic field generating means includes a magnet parallelly coupled to one of said two side extending portions.

3. A mechanism according to claim 1, wherein said second generating means includes a coil, having a hollow portion through which said central extending portion extends without contacting each other, for generating the second magnetic field at said central extending portion in accordance with a supplied current.

4. A mechanism according to claim 1, wherein said head supporting means includes a support member extending from a central portion of a side surface of said casing means which is opposite to said first generating means, said first head being arranged on said support member.

5. A mechanism according to claim 1, wherein said head supporting means includes a support member extending from a position of a bottom plate of said casing which is opposite to said generating means, said first head being arranged on said support member.

6. A mechanism according to claim 1 wherein said head supporting means further comprises:
a second head;
a supporting arm for supporting said second head fixed to oppose said first head;
a leaf spring member connected to said supporting arm; and
fixing means for fixing said leaf spring to an upper plate of said casing at a position opposite to said generating means, said supporting arm being movably coupled to said casing by said leaf spring member.

7. A mechanism according to claim 1, further comprising
guide means, arranged outside said casing, for guiding said carriage means.

8. A mechanism according to claim 7, wherein said guide means comprises:
three pairs of rotary bearings, said first and second pairs being arranged on opposing ends of one side of said casing, said third pair being arranged on a central portion of the other side thereof, one rotary bearing of said third pair being pre-loaded;
a first rod for guiding said casing means by using said first and second pairs of rotary bearings; and
a second rod for guiding said casing by using said third pair of rotary bearings.

9. A mechanism according to claim 7, wherein said guide means comprises:
a rail member arranged in a moving direction of said casing; and
base means coupled to said casing and to said rail member through balls, for moving on said rail member.

10. A head access mechanism for accessing at least one head to a destination track on a disk, comprising:
first generating means fixedly arranged, for generating a first magnetic field, including:
a first U-shaped yoke member;
a first I-shaped yoke member, coupled to said first U-shaped yoke member, for forming a first magnetic circuit;
a second U-shaped yoke member;
a second I-shaped yoke member, coupled to said second U-shaped yoke member, for forming a second magnetic circuit; and
carriage means for carrying a first head, including:
second generating means for generating a second magnetic field and receiving a propulsive force;
a casing which is fixed to said second magnetic field generating means and is capable of housing said first generating means; and
head supporting means arranged to said casing means at a position opposite to said generating means, for supporting said first head, said carriage means moving together with said first head in accordance with the propulsive force generated by interaction between the first and second magnetic fields, a center of gravity of said carriage means being present substantially on a line along which the propulsive force acts.

11. A mechanism according to claim 10 wherein said first magnetic circuit comprises:
a first magnet member parallelly coupled to one side portion of said first yoke member; and
said second magnetic circuit comprises a second magnet member parallelly coupled to one side portion of said second yoke member.

12. A mechanism according to claim 10, wherein said carriage means comprises:
holding means for holding said second magnetic field generating means, said holding means being moved between said first and second U-shaped yoke members; and
head supporting means arranged on said holding means at a position opposite said first generating means, for supporting said first head.

13. A mechanism according to claim 12, wherein said second magnetic field generating means includes a coil for generating the second magnetic field in accordance with a supplied current, said holding means being coupled to a central portion of a hollow portion of said coil, and side portions of said first and second U-shaped yoke members extending through the hollow portion along both sides of said holding means in a noncontact state.

14. A mechanism according to claim 12, wherein said head supporting means comprises:
a supporting member extending from a position of said holding means which is opposite to said generating means, said first head being arranged on said support member.

15. A mechanism according to claim 12, wherein said head supporting means further comprises:
- a second head;
- a supporting arm for supporting said second head opposite said first head;
- a leaf spring member connected to said supporting arm; and
- fixing means for fixing said leaf spring on an upper surface of said holding means at a position opposite to said generating means, said supporting arm being movably arranged by said leaf spring member.

16. A mechanism according to claim 12, further comprising:
- a rail member arranged in a moving direction of said holding means; and
- a base member coupled to said holding means and to said rail member with ball bearings, for moving on said rail member.

17. A head access mechanism utilizing a voice coil motor for linearly moving a carriage having at least one head mounted thereon, comprising:
- a rail member arranged in a moving direction of said carriage;
- a base member coupled to said carriage; and a plurality of ball bearings rollingly disposed between said rail member and said base member such that said base member is movably engaged with said rail member, a moving force for moving said carriage, case member and head provided by said voice coil motor.

18. A head access mechanism utilizing a voice coil motor for linearly moving a carriage having at least one head mounted thereon, said voice coil motor including a voice coil, comprising:
- holding means for holding said coil;
- a head arm mechanism, coupled to said holding means, for supporting said at least one head;
- a rail member arranged in a moving direction of said holding means; and
- a base member coupled to said holding means; and a plurality of ball bearings rollingly disposed between said rail member and said base member such that said base member is movably engaged with said rail member, a moving force for said holding means, base member and head provided by said voice coil motor.

* * * * *